Nov. 18, 1969 T. P. ENGEL 3,479,424

PRODUCING A HOLLOW MOLDING BY FOLDING AND SEALING A THERMOPLASTIC SHEET

Filed Jan. 24, 1966 3 Sheets-Sheet 1

INVENTOR
T. P. ENGEL
BY
Young & Quigg
ATTORNEYS

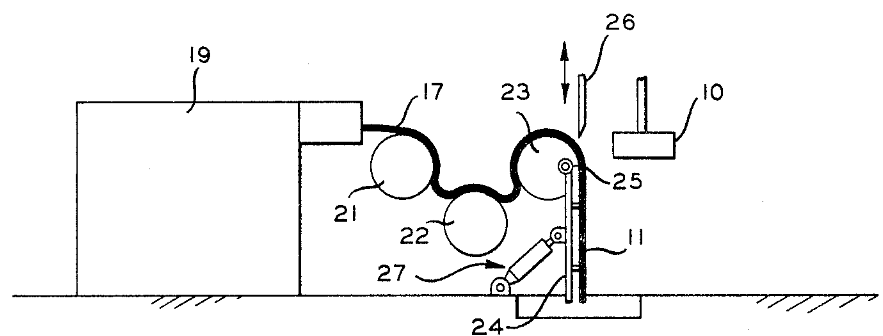
F/G. 3
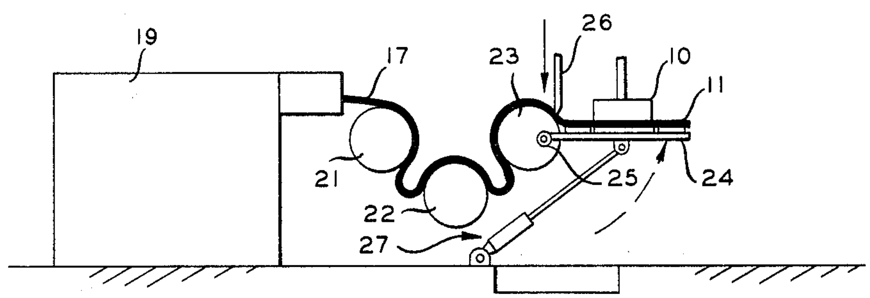
F/G. 4
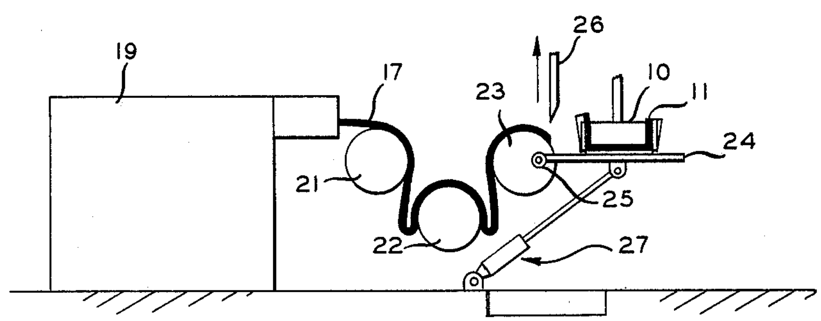
F/G. 5
INVENTOR
T. P. ENGEL
BY
ATTORNEYS

INVENTOR
T. P. ENGEL

BY

ATTORNEYS

United States Patent Office 3,479,424
Patented Nov. 18, 1969

3,479,424

PRODUCING A HOLLOW MOLDING BY FOLDING AND SEALING A THERMOPLASTIC SHEET

Thomas Paul Engel, Offenbach (Main), Germany, assignor to Phillips Petroleum Company, a corporation of Delaware Filed Jan. 24, 1966, Ser. No. 522,728
Int. Cl. B29d *23/10*
U.S. Cl. 264—151 6 Claims

ABSTRACT OF THE DISCLOSURE

A hollow molding of a thermoplastic sheet is produced by producing a heat softened sheet and moving hinged portions of a die member to fold the sheet around a core so that excess material forms folds extending outwardly and the supported parts of the sheet are brought into contact and fused together.

This invention relates to the production of hollow articles of thermoplastic material, and has for its object to provide a process for producing articles of relatively large size such as, for example, crates, baths and cabinets for television receivers, satisfactorily and at relatively low cost.

The invention provides for the production of such articles from material which is extruded in sheet form by wrapping the material, while in a heated, soft condition, about a core or former without materially stretching the said sheet material so as greatly to alter its thickness, excess material created by the wrapping operation being caused to produce outward folds which are cut off and the remaining material adhering together at the inner edges of the folds.

According to one aspect of the invention, a method of producing hollow mouldings of thermoplastic material comprises extruding the material in sheet form, placing the extruded sheet, in a plastic condition, between a core member and a die member having portions hinged together and foldable one relative to another to surround the core member, moving said hinged portions to their folded positions to fold the sheet of thermoplastic material to the shape of the core member so that excess material not supported by said hinged portions forms folds extending outwardly between adjacent edges of said hinged portions and the parts of the sheet supported by said hinged portions are brought together at their edges and joined, allowing the thermoplastic material to harden, and cutting off said outwardly extending folds.

The invention is hereinafter described with reference to the accompanying diagrammatic drawings, in which FIGURE 1 is a perspective view showing one step in the production of a rectangular container such as a crate by the method of the invention;

FIGURE 3 is a side elevation of an apparatus for carrying out the invention at the initial stage in the forming of an article;

FIGURES 4 and 5 are side elevations similar to FIGURE 3 showing further stages in the forming of the article;

Figure 1:
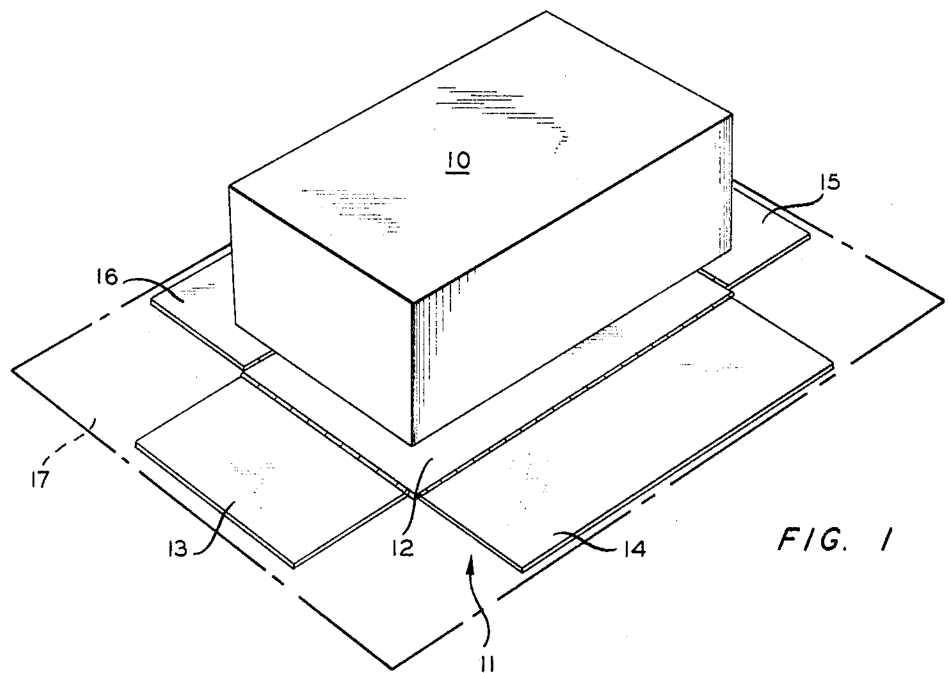
Figure 2:
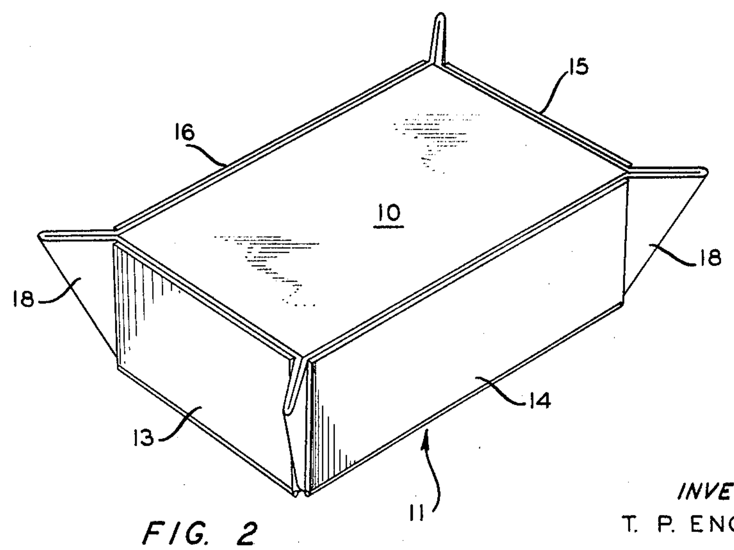
FIGURE 2 shows a later step in such production.

Referring to FIGURES 1 and 2, a core member 10 of rectangular shape is used in combination with a die member 11 comprising a central flat rectangular portion 12 of slightly larger dimensions than one side—the underside in the drawing, of the die member, and four other portions 13, 14, 15 and 16, each hinged to one edge of the portion 12 and adapted, when folded upwardly at right angles to the portion 12, to lie parallel to, and slightly spaced from, the four vertical sides of the core member 10. The length of the portions 13 to 16 is such that, in their folded positions, there are slight gaps between their adjacent edges.

In the position shown in FIGURE 1, the die member 11 is opened out flat and is spaced away from the core member 10. To produce a crate, a sheet of thermoplastic material, in a hot and plastic condition, is placed over the die member 11 so as wholly to cover it, as indicated in chain-dotted lines at 17 in FIGURE 1, the core member and die member are brought together so as to exert pressure on the central part of the sheet, and the portions 13, 14, 15 and 16 of the die member are folded up against the sides of the core member and pressed against the said sides, thus causing the sheet 17 to be wrapped around the core member and pressed against it as shown in FIGURE 2. The excess thermoplastic material at the corners of the sheet forms outwardly extending folds 18 which are pressed firmly against each other between the edges of the die portions 13, 14, 15 and 16, and, due to their plastic condition, adhere firmly together to form permanent joints at the corners of the crate.

The thermoplastic material is then allowed to harden, the folds 18 are cut off, and the finished moulding is removed from the die and core. Only relatively light pressure is required.

The thermoplastic sheet material is preferably of the so-called expanded or cellular form, a blowing agent having been mixed with it during plasticization, and the said sheet is preferably produced by extrusion, for example as described in my copending application Ser. No. 409,046, now U.S. 3,342,193.

Non-expanded thermoplastic sheet material may be used, and the said material, whether expanded or not, may be, for example, polyethylene.

Referring now to FIGURES 3 to 5 of the drawings, an extruding machine capable of producing a continuous sheet of thermoplastic material is shown at 19 and the material extruded is led over a series of supporting rollers comprising a first roller 21 continuously driven at a predetermined speed, a second roller 22 which can be driven at either half the speed or one and a half times the speed of the roller 21, and a third roller 23 which is driven intermittently at twice the speed of the roller 21. The second roller 22 is mounted below, and midway between the rollers 21 and 23, which are both mounted at the same level.

A pivoted table 24 is mounted so as to turn, at one edge thereof, about a fixed axis at 25, and supports the die member 11, the table being movable from a dependent position, shown in FIGURE 3 to a horizontal position shown in FIGURE 4 and 5, the pivot 25 being so positioned that, when the table 24 is vertical, the sheet of thermoplastic material running off the roller 23 lies close against the surface of the die member.

A knife 26 is provided to cut off pieces of the sheet which have been fed on to the table. The core member 10 is mounted for vertical movement in a position such that it is opposite the center portion of the die member when the table is in its horizontal position.

Means, such as a fluid pressure piston-and-cylinder device 27, are provided to move the table 24 from one position to the other, and similar devices (not shown) may be provided to raise and lower the core member 10 and to operate the knife 26.

The speed of rotation of the roller 21 is such that the sheet 17 is fed forward at substantially the same rate as it is extruded from the machine 19. The rollers may be heated if necessary to maintain the sheet in a plastic condition until it reaches the table 24.

On starting up the apparatus shown in FIGURES 3 to 5, the sheet 17 is fed forward over the rollers 21, 22, 23 until its end is resting on the roller 23 under the knife 26, as shown in FIGURE 5, and the loop supported by the roller 22 provides sufficient slack for the roller 23 to carry the end of the sheet forward without tensioning the sheet. The rollers are then started up, the roller 22 running at one and one half times the speed of the roller 21, until the sheet reaches the lower edge of the table 24, the roller 23 then being stopped and the speed of the roller 22 being reduced to half that of the roller 21, so that the loop is reformed and equally distributed on both sides of the roller 22.

The table 24 is now moved to its horizontal position, and the part of the sheet on the table is cut off by the knife as indicated in FIGURE 4.

As soon as the table 24 has assumed the horizontal position, the hinged portions of the die member 11 are folded upwardly and pressed against the sides of the core member as described with reference to FIGURES 1 and 2. The moulding is allowed to harden, the folds at the corners are cut off, and the die is opened and the table returned to its vertical position, allowing the moulding to be removed from the core. The roller 23 is then restarted to feed a fresh piece of sheet material on to the table, the roller 22 is again driven at its higher speed to enable the slack on both sides of that roller to be taken up equally, until the sheet again covers the table. This cycle of operations is repeated for each moulding.

Figure 6:
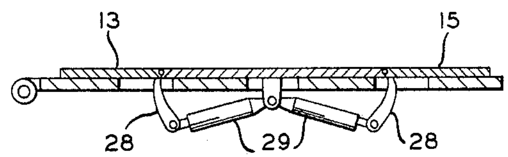
FIGURE 6 shows means for folding the die member shown in FIGURES 3 to 5.

The portions 13, 14, 15 and 16 of the die member may be moved relative to the central part to wrap the sheet 17 about the core member 10 by any suitable means. For example, as shown in FIGURE 6, a pair of opposite portions 13 and 15 may have fixed to them, adjacent their pivots, outwardly extending arms 28, and fluid pressure piston-and-cylinder devices 29 may be mounted between said arms 28 and a fixed anchorage point 31 underneath the central portion 12. The portions 13 and 15 can then be moved to their folded positions by applying fluid under pressure to extend the devices 29. A similar arrangement of arms and piston-and-cylinder devices is provided for the portions 14 and 16 of the die member.

Figure 7:
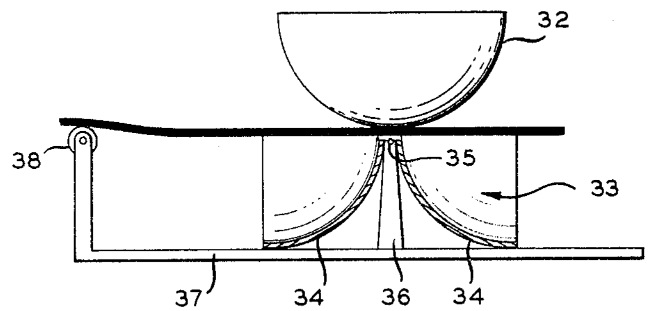
FIGURE 7 shows a core member and die member for forming a hemispherical hollow moulding.

The die member and core member can be shaped to form mouldings of other than rectangular shape, and may include more or less than the five portions shown in FIGURES 1 and 2. Moreover the portions of the die member need not be rectangular but may, for example, increase in width towards their sides which define the upper edges of the moulding, so that the latter is larger at the top than at the base. The die portions, and the surfaces of the core member with which they cooperate, need not be flat, but may be curved so as to provide curved walls on the moulding. For example, as shown in FIGURE 7, a core member 32 in the form of a hemisphere may be provided, and the die member 33 may consist of two quarter-spherical portions 34 hinged together at 35 along a tangent to a great circle containing their meeting edges. The said portions 34 are connected by the pivot at 35 to a pillar 36 standing up from a hinged table 37 corresponding to the table 24 but offset from the pivot axis 38 about which it turns so that, when the table is in the vertical position and the die member is open the said portions 34 lie wholly to one side of the plane in which the sheet 17 runs off the rollers 23 (FIGURES 3, 4 and 5).

The sheet 17, in this case, is, of course, somewhat stretched during the moulding operation, but the stretching is not sufficient material to affect the thickness of the walls of the finished moulding.

Figure 8:
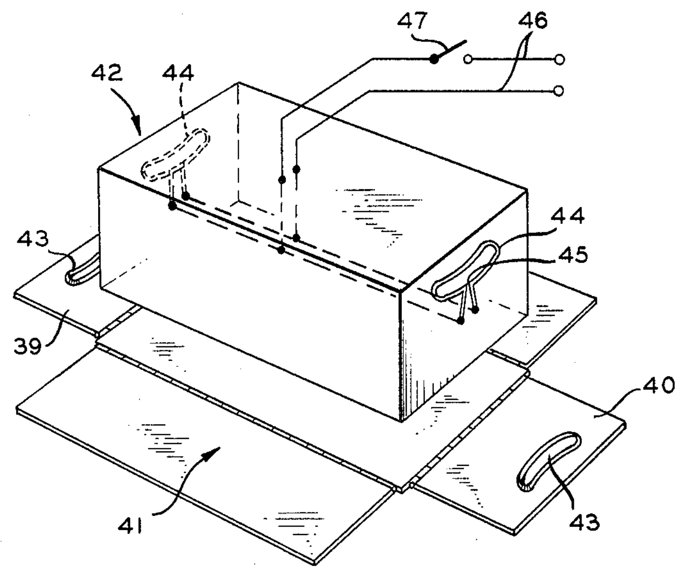
FIGURE 8 shows a core member and die member provided with means for forming cut-outs in the walls of a moulding produced by them.

FIGURE 8 of the drawings shows a method of producing cut-outs in the walls of a moulding produced by the method of the present invention. In the arrangement illustrated, the article to be produced is a crate, and cut-outs are to be provided in its end walls to serve as handgrips. The portions 39 and 40 of the die member 41 which cooperate with the ends of the core member 42 have mounted on their faces which lie opposite the end faces of the core member when the die member is folded, projecting cutting blades 43 defining the shape of the required cut-out. The depth of the said blades is slightly less than the final spacing between the surfaces of the core member and the die member.

Embedded in the end surfaces of the core member, so as to come opposite to the said blades 43, are metal strips, shown at 44, the said strips each forming a loop with a small gap at 45 and its ends, on opposite sides of the gap, being connected by suitable conductors indicated at 46, to a source of electric supply controlled by a switch 47.

When the die member is folded to mould a crate, the blades 43 cut nearly through the sheet of thermoplastic material, and when the folding is completed, an electric current is passed through the strips 44 for a brief time, heating the strips and melting the thin remaining layer of material under the blades, so that the cut-outs are completely severed, and are readily removed when the crate is removed from the core member. It will be understood that, if desired, the blades 43 may be mounted on the core member and the metal strips 44 may be mounted on the die member. The cutter is provided on at least one of the die member and the core member to substantially cut through the sheet.

I claim:

1. The method of producing a hollow molding of thermoplastic sheet material comprising:

placing a sheet of thermoplastic material, in a plastic condition, between a core member and a die member having a portion hinged together and foldable to embrace the core member, at least one of the die member and the core member having cutting means carried thereon;

moving the hinged portions to their folded positions to fold the sheet to the shape of the core material so that excess material not supported by the hinged portions form folds extending outwardly between adjacent edges of said hinged portions, the parts of the sheets supported by said hinged portions being brought into contact and fused together, and contacting said sheet with said cutting means during the movement of said hinged portions so as to substantially form a cutout portion in said sheet; and allowing the material to harden.

2. The method of claim 1 but prior to folding comprising the steps of:

(1) continuously extruding thermoplastic material in the form of a sheet;

(2) passing said sheet over a first supporting roller and continuously driving said first roller at a predetermined speed;

(3) passing said sheet from said first roller over a second supporting roller, then over a third supporting roller and then to means for folding said sheet to form said hollow molding;

(4) maintaining said second roller at a speed equal to one-half said predetermined speed and said third roller stopped to cause said sheet to be accumulated in the vicinity of said second roller while said hollow molding is being formed;

(5) maintaining said second roller at a speed equal to one and one-half said predetermined speed and said third roller at twice said predetermined speed until enough of said sheet material is fed to said means for folding to form another hollow molding;

(6) maintaining said sheet in heat softened plastic condition while it passes over said rollers and to said means for folding; and (7) repeating steps 4 and 5 to form a plurality of hollow moldings.

3. A method of producing a hollow molding of thermoplastic sheet material comprising:

extruding a plasticized thermoplastic material in the form of a sheet;

maintaining said sheet in a heat softened plastic condition while positioning it between a core member and a die member having portions hinged together and foldable to embrace the core member;

moving the hinged portions to their folded positions to fold the sheet to the shape of the core member so that excess material not supported by the hinged portions forms folds extending outwardly between adjacent edges of said hinged portions and the parts of the sheet supported by said hinged portions are brought into contact and fused together;

contacting said sheet with cutting means having a depth slightly less than the final thickness of the wall of said molding carried upon said die member during the movement of said hinged portion so as to partially form a cut-out portion in said sheet;

completing the severance of said cut-out portion by contacting the portion of the molding wall away from the cutting means with a heated metal strip conforming to the outline of the cutting means; and allowing the material to harden.

4. A method of producing a hollow molding of thermoplastic sheet material comprising:

placing a sheet of thermoplastic material, in a plastic condition, between a core member and a die member having a portion hinged together and foldable to embrace the core member, said die member having cutting means carried thereon, said cutting means having a depth slightly less than the final thickness of the wall of said molding;

moving the hinged portions to their folded positions to fold the sheet to the shape of the core material so that excess material not supported by the hinged portions form folds extending outwardly between adjacent edges of said hinged portions, the parts of the sheets supported by said hinged portions being brought into contact and fused together, and contacting said sheet with said cutting means during the movement of said hinged portions so as to partially form a cut-out portion in said sheet; and completing the severance of said cut-out portion by contacting the portion of said wall away from the cutting means with a heated metal strip conforming to the outline of said cutting means.

5. A method of producing a hollow molding of thermoplastic sheet material comprising:

extruding a plasticized thermoplastic material in the form of a sheet;

maintaining said sheet in a heat softened plastic condition while positioning it between a core member and a die member having portions hinged together and foldable to embrace the core member;

moving the hinged portions to their folded positions to fold the sheet to the shape of the core member so that excess material not supported by the hinged portions forms folds extending outwardly between adjacent edges of said hinged portions and the parts of the sheet supported by said hinged portions are brought into contact and fused together;

contacting said sheet with cutting means having a depth slightly less than the final thickness of the wall of said molding carried upon said core member during the movement of said hinged portion so as to partially form a cut-out portion in said sheet;

completing the severance of said cut-out portion by contacting the portion of the molding wall away from the cutting means with a heated metal strip conforming to the outline of the cutting means; and allowing the material to harden.

6. A method of producing a hollow molding of thermoplastic sheet material comprising:

placing a sheet of thermoplastic material, in a plastic condition, between a core member and a die member having a portion hinged together and foldable to embrace the core member, said core member having cutting means carried thereon, said cutting means having a depth slightly less than the final thickness of the wall of said molding;

moving the hinged portions to their folded positions to fold the sheet to the shape of the core material so that excess material not supported by the hinged portions form folds extending outwardly between adjacent edges of said hinged portions, the parts of the sheets supported by said hinged portions being brought into contact and fused together, and contacting said sheet with said cutting means during the movement of said hinged portions so as to partially form a cut-out portion in said sheet; and completing the severance of said cut-out portion by contacting the portion of said wall away from the cutting means with a heated metal strip conforming to the outline of said cutting means.

References Cited

UNITED STATES PATENTS

| | | | |
|---|---|---|---|
| 3,360,420 | 12/1967 | Paul | 156—492 |
| 1,631,518 | 6/1927 | Cleaves | 93—58.5 |
| 2,548,251 | 4/1951 | Bergstein | 229—5.5 |
| 2,797,443 | 7/1957 | Carlson | 18—48 |
| 2,973,697 | 3/1961 | Lerner | 93—8 |

FOREIGN PATENTS

| | | |
|---|---|---|
| 1,381,009 | 10/1964 | France. |
| 348,260 | 1960 | Switzerland. |

ROBERT F. WHITE, Primary Examiner

RICHARD R. KUCIA, Assistant Examiner

U.S. Cl. X.R.

264—163, 322, 339